(12) United States Patent
Shaw et al.

(10) Patent No.: US 8,762,185 B2
(45) Date of Patent: Jun. 24, 2014

(54) TRAVEL EXPENSE AUTOMATION

(71) Applicant: Serko Limited, Auckland (NZ)

(72) Inventors: Robert James Shaw, Auckland (NZ); Darrin Grafton, Auckland (NZ)

(73) Assignee: Serko Limited, Auckland (NZ)

( * ) Notice: Subject to any disclaimer, the term of this patent is extended or adjusted under 35 U.S.C. 154(b) by 0 days.

(21) Appl. No.: 14/166,416

(22) Filed: Jan. 28, 2014

(65) Prior Publication Data

US 2014/0143105 A1    May 22, 2014

Related U.S. Application Data

(63) Continuation of application No. PCT/NZ2012/000134, filed on Aug. 2, 2012.

(30) Foreign Application Priority Data

Aug. 3, 2011   (NZ) .................................... 594388

(51) Int. Cl.
*G06Q 50/00*    (2012.01)
*G06Q 10/02*    (2012.01)

(52) U.S. Cl.
CPC .................................... *G06Q 10/025* (2013.01)
USPC .................... 705/6; 705/5; 705/7.18; 705/16; 705/30; 705/34

(58) Field of Classification Search
CPC ............................. G06Q 10/025; G06Q 40/10
USPC ................................ 705/5, 6, 7.18, 16, 30, 34
See application file for complete search history.

(56) References Cited

U.S. PATENT DOCUMENTS

| 7,865,411 | B2 | 1/2011 | Stone et al. | |
| 7,957,718 | B2 | 6/2011 | Gaskarth et al. | |
| 8,005,426 | B2 | 8/2011 | Huomo et al. | |
| 8,215,546 | B2 | 7/2012 | Lin et al. | |
| 8,538,827 | B1 * | 9/2013 | Dryer et al. | 705/26.1 |
| 2003/0046104 | A1 | 3/2003 | Lee et al. | |
| 2005/0015316 | A1 | 1/2005 | Salluzzo | |
| 2007/0083401 | A1 | 4/2007 | Vogel et al. | |
| 2008/0046347 | A1 * | 2/2008 | Smith et al. | 705/30 |
| 2008/0208681 | A1 | 8/2008 | Hammad et al. | |
| 2009/0098825 | A1 * | 4/2009 | Huomo et al. | 705/16 |

(Continued)

FOREIGN PATENT DOCUMENTS

| EP | 2 315 170 | 4/2011 |
| WO | 2011/066327 | 6/2011 |

OTHER PUBLICATIONS

International Search Report, PCT/NZ2012/000134, Jan. 9, 2013.

(Continued)

*Primary Examiner* — Ryan Zeender
*Assistant Examiner* — Hunter Wilder
(74) *Attorney, Agent, or Firm* — Young & Thompson

(57) ABSTRACT

A method of monitoring the expenses of a traveller during the progress of an itinerary utilises NFC for carrying out the financial transactions associated with the itinerary and updates a corporate ERP or similar financial database with the financial transactions as they occur allowing rapid allocation to cost centres. The itinerary may be laid out in terms of itinerary events, each of which may be tracked by an NFC connection with an NFC device at an expected location and date for the itinerary event.

5 Claims, 3 Drawing Sheets

(56) References Cited

U.S. PATENT DOCUMENTS

| | | | |
|---|---|---|---|
| 2010/0017314 A1* | 1/2010 | Johnson et al. | 705/30 |
| 2011/0119179 A1 | 5/2011 | Votaw et al. | |
| 2012/0059745 A1* | 3/2012 | Fredericks et al. | 705/30 |
| 2012/0259748 A1* | 10/2012 | Young et al. | 705/34 |

OTHER PUBLICATIONS

"SAP Mobile Applications—Unwire Your Enterprise", Customer Presentation May 13, 2011. 'Travel Expense Receipt Capture' —p. 21, 'Travel Expense Report & Approval System' —p. 22 and 'Travel Expenses' —p. 23 in particular.

Simplified Expense Management, http://web.archive.org/web/20101223182810/http://www.concur.com/en-us/products/enterprise-software/expense-report, Dec. 23, 2010.

How Concur works on your smartphone, http://web.archive.org/web/20101223191747/http://www.concur.com/en-us/features/mobile, Dec. 23, 2010.

Corporate travel booking made easy, http://web.archive.org/web/20101223184821/http://www.concur.com/en-us/products/enterprise-software/corporate-travel-booking, Dec. 23, 2010.

Pick a card. Any card. Concur Breeze has credit card integration covered, http://web.archive.org/web/20101223182637/http://www.concur.com/en-us/features/small-business-expense/credit-card-integration, Dec. 23, 2010.

Turn your corporate card into a cash flow management tool, http://web.archive.org/web/20101223185252/http://www.concur.com/en-us/products/small-business/cash-flow-management, Dec. 23, 2010.

Tracking business expenses made easy, http://web.archive.org/web/20101223191544/http://www.concur.com/en-us/products/small-business/expense-tracking. The webpages were retrieved on Dec. 12, 2012 and Dec. 13, 2012 from the internet. The webpages were published on Dec. 23, 2010 as per Wayback Engine.

http://web.archive.org/web/20100313042755/http://www.expenseanywhere.com/integration_with_erp.aspx, Dec. 23, 2010.

http://web.archive.org/web/20100309083438/http://www.expenseanywhere.com/online.aspx The webpages were retrieved on Jan. 4, 2013 from the internet. The webpages were published on Mar. 9, 2010 and Mar. 13, 2010 as per Wayack Engine.

Enterprise Resource Planning (ERP)—IS 350 Lecture Notes Department of Computer Information Systems, College of Business Eastern Michigan University, 2008. pp. 55 to 60 in particular. This document was retrieved from the internet on Jan. 2, 2013. This document was published on Mar. 16, 2008 as per Wayback Engine (URL<http://web.archive.org/web/20080316232045/http://people.emich.edu/schung1/350/lectures/>).

Travel & Expense Management Benchmarking—Improving T & E Process through Automation, Paystream Advisors Survey Report, Q1 2011. pp. 17 and 18 in particular. This document is published before the earliest priority date and is referred to in a later document ie Rorthberg, A., "Expense Reporting: Web Apps Gain on Spreadsheets", Jun. 22, 2011.

Corporate Travel Booking—Their needs, your rules, web.archive.org/web/20120316224515/http://www.concur.com/en-us/products/enterprise-software/corporate-travel-booking, Nov. 18, 2013, Business Travel Booking & Management Programs | Online Corporate Travel Management & Policy | Concur.

Cash Flow Management—A bridge over turbulent green waters | Concur, web.archive.org/web/20120316224404/http://www.concur.com/en-us/products/small-business/cash-flow-management, Mar. 16, 2012.

Expense Reports—Reduce paper and stress levels, web.archive.org/web/20120316225408/http://www.concur.com/en-us/products/enterprise-software/expense-report, Mar. 16, 2012.

Expense Reporting, Go Digital, Automate Payments and Ensure Compliance, web.archive.org/web/20120331185026/http://www.concur.com/en-us/expense-report, Mar. 31, 2012.

Australian Official Action—2013101619—Feb. 28, 2014.

* cited by examiner

TRAVEL EXPENSE AUTOMATION

CROSS REFERENCE TO RELATED APPLICATIONS

This application is a continuation of PCT/NZ2012/000134 filed on Aug. 2, 2012, which claims foreign priority to New Zealand Application No. 594388 filed on Aug. 3, 2011. The entire contents of each of the above applications are hereby incorporated by reference.

TECHNICAL FIELD

The invention generally relates to the automation of the handling of the expenses of a traveller within an ERP (Enterprise Resource Planning) system.

More particularly the invention relates to the association of the itinerary of a traveller as lodged in an ERP system with the acceptance of expenses at appropriate times.

BACKGROUND ART

ERP systems manage the resources of an organisation, from the financial through personnel, project management, manufacturing, sales, service, customer relations management systems, document management, itinerary planning and such various other functions as the enterprise requires.

An ERP system typically is made up of a transactional database with software modules to handle one or more of the functions required. Interaction with the modules is typically by a web interface and the database and modules may be part of a cloud computing system.

The present invention is intended to deal with the situation in which an enterprise employee, manager or director is remote from the enterprise base. In such a situation the person has expenses which are paid by and should be recorded by the enterprise. This may prove difficult, requiring the collecting of receipts by the person concerned and the subsequent recording of these in the ERP system.

The use of credit cards reduces the problems to some extent but the recorded transaction may not reflect what is actually happening and typically requires reconciliation after the travel is completed.

Various efforts have been made to resolve some of the problems associated with recording expenses for a remote traveller. Among these are:

Patent application US20110119179 relates to processing payment transactions between enterprise resource planning systems and particularly relates to the conversion of the invoice format between the two systems.

Patent application US 2003/0046104 relates to a method for the approval of expense applications in which the expense is automatically approved if it falls within specified parameters.

U.S. Pat. No. 7,865,411 relates to an accounts payable process in which details from an invoice are matched against a purchase order.

U.S. Pat. No. 7,957,718 relates to a method and apparatus for telecommunication expense management which provides a pop-up query when a call is completed in order to allocate the expense of the call.

Patent application US 2007/0083401 relates to travel and expense management. The specification describes a travel approval system centrally storing travel data and integrated with the travelling users.

Patent application US 2005/0015316 A1 Methods for calendaring, tracking, and expense reporting, and devices and systems employing same (abandoned 2008). The specification describes a system which stores an itinerary, tracks the traveller along points on the itinerary both physically and by time and automatically assigns expenses to appointments on that itinerary. The system is traveller centric but has an enterprise centralised computer system.

Such systems leave unanswered the question as to how the system ensures that the costs recorded are correct and how to reduce to a minimum the travelers interaction with payment systems during travel.

Also well known is the NFC (Near Field Communication) communications protocol which uses the NDEF protocol for the two way transfer of data between two devices by RFID tag transmissions. The protocol works by induction when two such devices are within a short distance of each other, typically 4 cm to 20 cm, and automatically establishes a connection between them. It is known that the NFC system may be used for contactless payment systems, see for instance U.S. Pat. No. 8,215,546.

There remains the problem of ensuring that the ERP system correctly records and allocates the expenses of a remote traveller.

The present invention provides a solution to this and other problems which offers advantages over the prior art or which will at least provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

A reference to an "NFC" equipped device refers to a device which can communicate using a Near Field Communication protocol.

A reference to an "ERP" is a reference to an Enterprise Resource Planning system including at least an accounting system and a corporate travel planning system including itinerary planning and expenditure capability.

A reference herein to an itinerary "event" is a reference to a point at which there is a notable occurrence in the itinerary of a traveller. Such events may include points in space and time at which: a mode of transport changes (from aircraft to foot, from foot to taxi, from taxi to foot, from foot to rail); at which a payment is received, made or committed to (porters tip, meal expenditure, taxi charge, check out); at which a specific communication is received or made (aircraft gate check-in, phone initiated parking charge) or other occurrences which have relevance to the incurring of debt or the receiving of income as recorded in an ERP system.

SUMMARY OF THE INVENTION

In one exemplification the invention consists in a method of carrying out a financial transaction with a first NFC equipped device using a second device associated with a traveller which device is NFC equipped and has internet access, the second device receiving from or supplying to the first NFC device an invoice or receipt relating to one or more items, authorising a payment to or receiving a payment authorisation from the first device, thereby initiating a financial transaction, conveying from the second device to a remote ERP system information relating to the financial transaction, the remote ERP including the capability to allocate costs and payments against cost centres and having an itinerary for the traveller carrying the second device, the itinerary having one or more itinerary events in the itinerary, characterised in that at the remote ERP system the financial transaction is allocated against an itinerary event stored in the ERP system and the items of the financial transaction are allocated against cost centres in the ERP system.

Preferably the second device carries a replicate of the itinerary and itinerary events.

Preferably the itinerary events are identifiable events occurring during the progress of the itinerary and preferably at least some of the itinerary events are predicted to occur within a specific time frame.

Preferably the itinerary may be amended at the remote ERP system and replicated in the second device.

Preferably the second device has sufficient itinerary details to query expected item cost centres with the traveller.

Preferably the second device may allocate items to unexpected cost centres.

In a second embodiment the invention may consist in a system for the initiating of a financial transaction by a traveller travelling on an itinerary which itinerary has itinerary events,
- the traveller travelling with a first device which is NFC equipped and remote communication capable and capable of initiating financial transactions with a second NFC equipped device;
- the first device interacting with a second NFC equipped device to carry out a financial transaction related to an itinerary event and to receive an invoice or receipt relating to items within that financial transaction;
- a remote ERP system storing the traveller itinerary and the expected itinerary events;
- the first device communicating with the remote ERP system upon completion of the transaction with information including details of the transaction and including the items within that transaction;
- characterised in the remote ERP system allocating the financial transaction against an itinerary event and allocating the items against cost centres in the ERP system.

These and other features of as well as advantages which characterise the present invention will be apparent upon reading of the following detailed description and review of the associated drawings.

DESCRIPTION OF THE INVENTION

Figure 1:
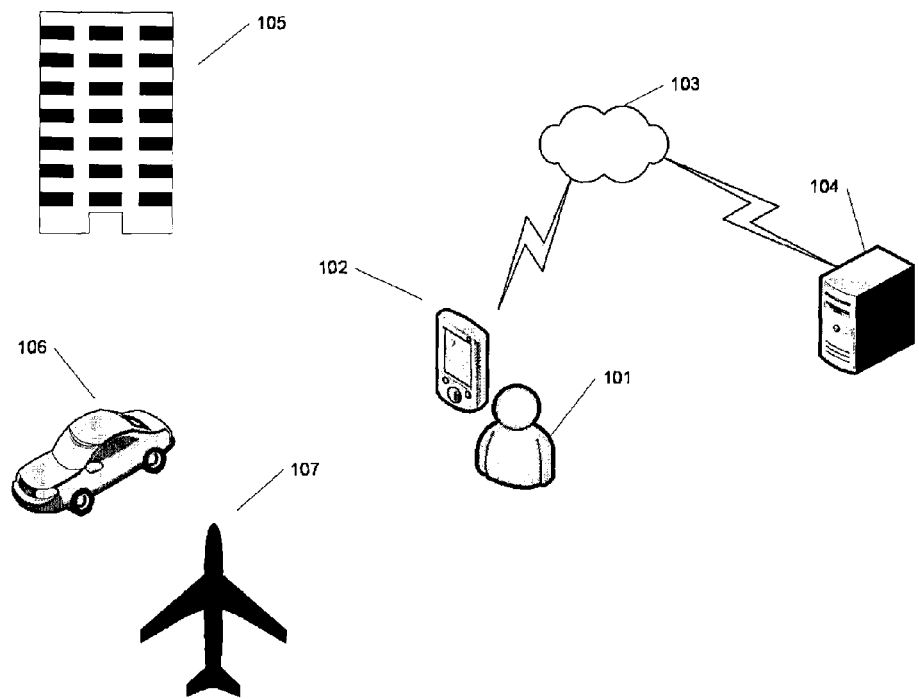
FIG. 1 is a general illustrative view of the technology involved in the invention.

Referring now to FIG. 1 the inventive system predicates a traveller carried device which interacts with a remote ERP so that the combined system:
1) records in the travelers corporate ERP the travelers itinerary, and replicates a copy to the traveller carried device;
2) matches any change of the itinerary location to a one or more itinerary events occurring at specified times and places;
3) queries the itinerary event supplier or is queried by the itinerary event supplier for the required payment;
4) optionally queries the traveller for expense approval or authorisation;
5) initiates any approved financial transaction;
6) notifies the remote ERP of the expenditure or payment for the itinerary event as soon as this is possible;
7) notifies the remote ERP of the cost centres for the itinerary event.

FIG. 1 shows the travelers NFC equipped device 101, typically a mobile phone, its internet connection 102 to a remote ERP system 103 which holds the original of the travelers itinerary, its local connections to payment initiating NFC devices at a hotel 104, a taxi 105 or an airport 106 using the NFC NDEF protocol. Most itinerary items will have itinerary events associated with them, for instance an airport flight may have an associated entry in to a taxi, and exit from the taxi plus payment, a flight check in assuming there is baggage and a gate check in. Preferably each of these locations has an NFC identifying device which can serve to identify the traveller through the travelers NFC equipped device, and preferably where a financial transaction takes place at that location the NFC device can initiate a financial transaction with the travelers device if required.

Each of these locations occurs at a known itinerary event in the travelers itinerary and reporting back of these assists the corporate ERP in tracking the progress of the traveller and, by reporting back payments, recording the expenses of the traveller. The presence of the travelers device at a location can be estimated from location services using the location of found WiFi network names or phone cell locations or from a device GPS and failing this by the traveller manually activating an itinerary event.

The travelers phone may communicate with the remote ERP system via the internet or via any other available communication method when and where possible and the travelers itinerary may update the ERP system and be updated from the remote ERP system in this manner so that it carries a replica of the ERP itinerary. Typically the travelers phone will communicate with the ERP via WiFi rather than a telephone data link when outside of the home country in the interests of cost, and typically the WiFi connection will be only at selected locations.

The travelers device detects the occurrence of an itinerary event, for instance the passage of the phone past a checkout NFC device at a hotel at or near the time specified in the itinerary for checkout will be interpreted as an itinerary event for checkout, and retrieves from the checkout facility via NFC the expenditure incurred at the hotel. The traveller may authorise this for payment by NFC and the payment can then later be reported back to the remote ERP by a report conveyed from the travelers phone of the itemised invoice/receipt provided to the traveller by NFC.

In similar manner the traveller may take a taxi from the hotel to an airport. The taxi preferably has an identified transaction triggering NFC device and on leaving the taxi the device is queried, using the travelers device, for the required fare. Once the traveller authorises that fare a financial transaction will occur and again the transaction can be later reported through a WiFi connection or the travelers data connection to the corporate ERP.

Figure 2:
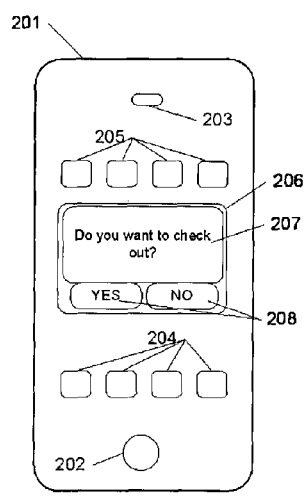
FIGS. 2 to 7 show drawing depicting the screen of a travelers mobile phone at various stages of the inventive process.

FIG. 2 shows a display on an NFC equipped mobile phone 201 having control buttons 202, 203 and screen icons 204, 205 when the phone is passed by an NFC terminal in a hotel at a date and time which falls near to the expected check out time as recorded as an itinerary event in both the phone and the corporate ERP database. The monitoring application in the phone questions at 206 in message 207 whether checkout is required. Response icons 208 show the allowed responses and if the "YES" icon is touched the NFC connection queries the hotel for a checkout invoice.

Figure 3:
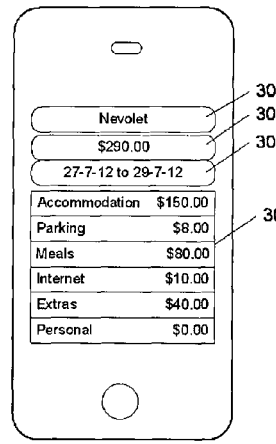

This checkout invoice is parsed by the NFC transaction application and processed to show as at FIG. 3 the name of the billing centre at 301, the total billed amount at 302 and the billing period at 303. The latter may be broken down to the hotel cost centre items at 304.

Figure 4:
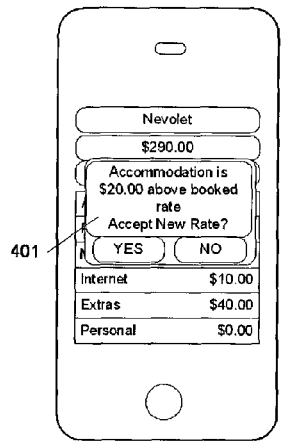

The phone application will have stored the predicted itinerary expenses and if this differs from the expected amount will raise a notification. This may produce a message 401 as seen in FIG. 4 on which the traveller can act before confirming the payment.

Similarly the phone application may provide for judging whether some of the expenses are corporate or personal expenses and presenting them differently to the remainder, for instance by coloration. It may also query the traveller as to whether such expenses should be assigned as to personal expenses as other than approved expenses as in FIG. 5 at 501. If this is so the payment may be split so that the corporate part of the expenses is paid with the stored corporate credit card details and the personal part paid with the travelers own credit card.

Once all such queries have been answered the appropriate financial transaction or transactions will be performed with the hotel through the NFC connection and recorded by the travelers phone, either as data or as part of an uploadable webpage. Subsequently or simultaneously, depending on WiFi access, the phone application will transfer the itemised receipt to the remote ERP system together with details of the cost centres (corporate/personal, meals, accommodation, entertainment, etc).

Figure 6:
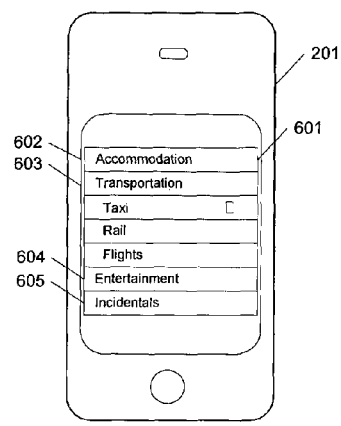
Figure 7:
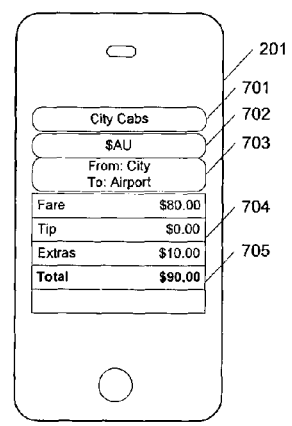

Having checked out of the hotel the traveller may wish to take a taxi to the airport and hails a cab from outside the hotel. En route the traveller selects the cost centre menu 601 of FIG. 6 and selects the transportation "Taxi'. When the taxi arrives at the destination it is only necessary to pass the phone past the taxi NFC device and the invoice for the trip will be presented as at FIG. 7. Typically the organization name appears at 701, the currency type at 702, the details of the completed trip at 703 and the item detail at 704 with a total at 705. A confirmation touch on the screen will carry out the financial transaction leaving the travellers phone with transaction receipt details which will later be passed on to the remote ERP.

Figure 8:
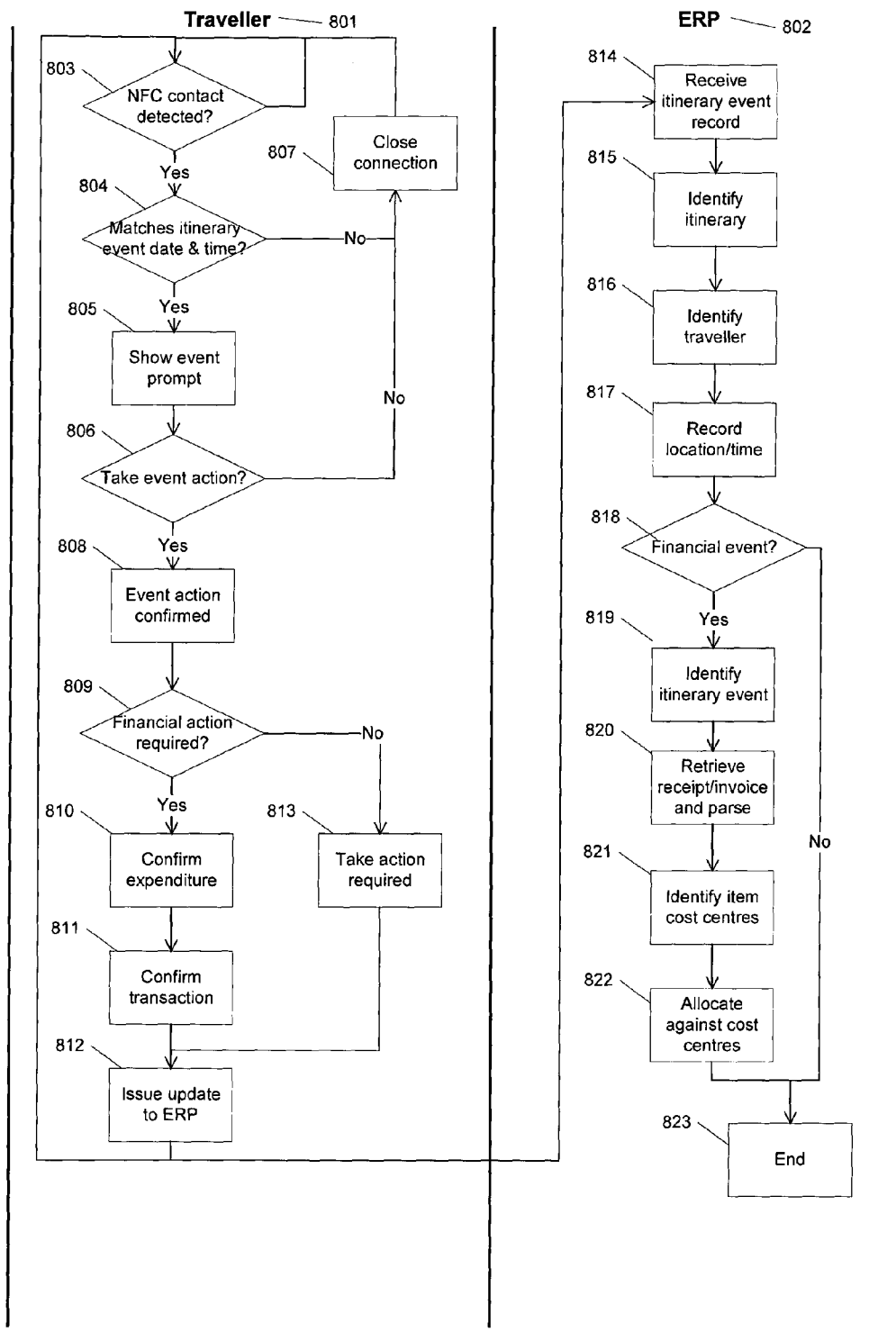
FIG. 8 is a flow diagram of one version of the flow process of the invention.

FIG. 8 shows a flowsheet of the phone and ERP process involved in carrying out the NFC connection and the transfer of data to the remote ERP. The left column relates to actions within the phone application of the traveller at 801 while the right column relates to actions at the remote ERP 802. Initially the phone NFC device contacts at 803 another NFC device with which it can exchange data, preferably receiving an indication of the organisation providing the NFC device.

At 804 the application determines whether the NFC connection matches one of the itinerary events as to date and time. Typically each event will have an event start time and an event end time within which the event is expected to fall. For instance where the traveller is leaving the hotel to take an airline flight the end time will be the minimum cross town taxi time from the last possible check in time for the flight while the start time may be several hours beforehand.

Where the time matches that of an itinerary event the application will assume that the connection is correct for the event will show the event prompt at 805 asking the traveller whether to carry out the expected event, as in FIG. 2. If not affirmed the NFC application then reverts to awaiting a new connection at 807. If affirmed at 806 the application confirms that the itinerary event is taking place at 808 and if the event involves a financial transaction, as at 809, retrieves from the connection the financial information as an invoice and presents it as in FIG. 3. Whilst doing this the application will check at 810 that the amounts match those originally entered during the itinerary creation and if not raises an error as in FIG. 4 and typically allocates part of the expenses as personal and may pay these expenses using a personal account.

Where the expense of the itinerary event is small enough the mere detection of an NFC device for that itinerary event may be sufficient to allow the carrying out of the financial transaction.

Figure 5:
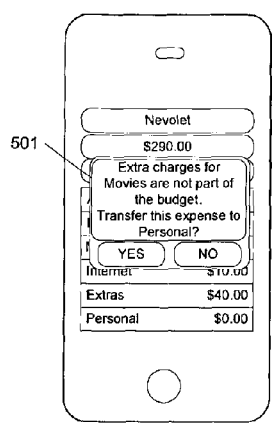

The application may also check that all the items meet the cost centre amounts predicted by the itinerary for this event as in FIG. 5 and may prompt the traveller as to which cost centre amounts which have not been predicted should be allocated to.

If no other financial matters are raised the transaction or transactions are confirmed at 811 and takes place through the NFC connection. Following this the application checks at 812 if a connection to the remote ERP is available and if so provides an update of the receipt by internet data connection or some other method to the remote ERP, including an itinerary event identifier. If no connection is available the application returns to awaiting an NFC connection and also awaits an opportunistic connection to the remote ERP. The update is eventually received at 814, the itinerary identified at 815 and the traveller concerned at 816. The occurrence of the itinerary event is then logged at 817. If the itinerary event was a financial event then the event is identified at 819 and the expected expense items retrieved from storage. At 820 the received update, whether invoice or receipt, is parsed to extract the items and the cost centres checked, noting that these should already have been allocated by the traveller as in FIG. 5 in the phone application. Where necessary any required amendments may be queried with the traveller and the recording of the itinerary event is then ended at 823. Typically any discrepancies between the itinerary at the ERP and the replica at the travelers device will be corrected by uploading the updated itinerary from the remote ERP the next time the application connects to the ERP.

The travelers NFC equipped device may be used for purposes other than financial transactions, for instance the travelers bags may have RFID tags, and this allows the traveller to positively identify bags during travel, for instance at airport baggage claim.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the invention is described in its application to an itinerary in which only expenses may be involved, but the invention is equally as applicable to an itinerary including the selling of items and may produce invoices for transfer to a participating NFC connection and receive an authorisation to transfer funds from that NFCs organisation. The invention may thus vary dependent on the particular application for which it is used without variation in the spirit and scope of the present invention.

In addition, although the preferred embodiments described herein are directed to the recording of itinerary events and their associated transactions in an ERP system, but it will be appreciated by those skilled in the art that variations and modifications are possible within the scope of the appended claims.

INDUSTRIAL APPLICABILITY

The method of the invention is used in the transfer and correlation of data between an invoice or receipt receiving device travelling on an itinerary and a corporate ERP system recording details of the itinerary, the transferred data relating to itinerary events and being recorded as financial transactions against cost centres in the ERP. The present invention is therefore industrially applicable.

The invention claimed is:

1. A first mobile device configured to:
remotely communicate and carry out a financial transaction through a NFC connection; and
remotely communicate to an Enterprise Resource Planning system (ERP) carrying an itinerary of a user of the first mobile device, and
carry the itinerary of the user in a storage of the first mobile device, the itinerary including a plurality of expected itinerary events and expected expenditures for each of the plurality of expected itinerary events versus a plurality of expenditure cost centers,
wherein before completion of the NFC connection of the financial transaction a transaction amount of the financial transaction is identified against at least one of the plurality of expected itinerary events versus at least one of the plurality of expenditure cost centers and compared with a respective expected expenditure for the at least one of the plurality of expected itinerary events and if the transaction amount differs from the respective expected expenditure the user is queried for a proposed cost center for a differing amount the transaction amount differs, and
wherein after completion of the financial transaction through the NFC connection, the first mobile device communicates in a communication details of the financial transaction to the ERP with the at least one of the plurality of expenditure cost centers and the transaction is allocated against the at least one of the plurality of expenditure cost centers at the remote ERP and when the proposed cost center differs from the at least one of the plurality of expenditure cost centers the communication to the ERP includes at least the differing amount allocated against the proposed cost center.

2. The first mobile device as claimed in claim 1, wherein the amount the transaction amount differs is carried out as a separate financial transaction through the NFC connection.

3. A method of performing a financial transaction, comprising:
communicating an invoice or a receipt containing a transaction amount relating to one or more items through a NFC connection between a first device and a second device both being NFC equipped, the second device carrying an itinerary of the traveler, the itinerary including a plurality of expected itinerary events and expected expenditures for each of the plurality of expected itinerary events versus a plurality of expenditure cost centers;
initiating the financial transaction by authorizing a payment to or receiving a payment authorization from the first device via the NFC connection;
identifying at least one of the plurality of expected itinerary events versus at least one of the plurality of expenditure cost centers relates to the transaction amount;
comparing a respective expected expenditure of the identified at least one of the plurality of expected itinerary events to the transaction amount;
determining the transaction amount differs from the respective expected expenditure by a differing amount;
querying the traveler on the second device for a proposed cost center for the differing amount before completion of the financial transaction; and
communicating in a communication details of the financial transaction to a remote Enterprise Resource Planning system (ERP) also carrying the itinerary of the traveler after completion of the financial transaction, the communication including the at least one of the plurality of expenditure cost centers and the differing amount allocated against the proposed cost center.

4. The method of performing the financial transaction as claimed in claim 3 wherein the expected itinerary events are identifiable events occurring during a progress of the itinerary and preferably at least some of the expected itinerary events are predicted to occur within a specific time frame.

5. A system for performing a financial transaction, comprising:
a first device of a traveler initiating a financial transaction having a transaction amount with a second device through a NFC connection, wherein both the first device and the second device are NFC equipped and wherein the first device carries an itinerary of the traveler, the itinerary including a plurality of expected itinerary events and expected expenditures for each of the plurality of expected itinerary events versus a plurality of expenditure cost centers;
the first device identifying at least one of the plurality of expected itinerary events versus at least one of the plurality of expenditure cost centers relates to the transaction amount;
the first device comparing a respective expected expenditure of the identified at least one of the plurality of expected itinerary events to the transaction amount;
the first device determining the transaction amount differs from the respective expected expenditure by a differing amount;
the first device querying the traveler for a proposed cost center for the differing amount before completion of the financial transaction; and
the first device communicating in a communication details of the financial transaction to a remote Enterprise Resource Planning system (ERP) also carrying the itinerary of the traveler after completion of the financial transaction, the communication including the at least one of the plurality of expenditure cost centers and the differing amount allocated against the proposed cost center.

* * * * *